United States Patent
Morgenstern et al.

(10) Patent No.: US 7,357,580 B2
(45) Date of Patent: Apr. 15, 2008

(54) THREE PIECE RECEPTACLE ASSEMBLY FOR OPTICAL TRANSCEIVER SUB-ASSEMBLIES

(75) Inventors: David J. Morgenstern, Palo Alto, CA (US); Stefan M. Pfnuer, Los Gatos, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/374,748

(22) Filed: Mar. 14, 2006

(65) Prior Publication Data
US 2006/0204180 A1   Sep. 14, 2006

Related U.S. Application Data

(60) Provisional application No. 60/661,783, filed on Mar. 14, 2005.

(51) Int. Cl.
*G02B 6/36* (2006.01)
*G02B 6/38* (2006.01)

(52) U.S. Cl. ............... 385/84; 385/55; 385/56; 385/58; 385/60; 385/62; 385/69; 385/75; 385/76; 385/77; 385/78; 385/81; 385/86; 385/87; 385/88; 385/90; 385/92

(58) Field of Classification Search ............... 385/84
See application file for complete search history.

(56) References Cited

U.S. PATENT DOCUMENTS

| | | | | |
|---|---|---|---|---|
| 4,215,913 A * | 8/1980 | Turley et al. | ............... | 385/64 |
| 4,813,760 A * | 3/1989 | Tanaka et al. | ............... | 385/62 |
| 5,394,496 A * | 2/1995 | Caldwell et al. | ............ | 385/70 |
| 5,461,688 A * | 10/1995 | Lee | ............................ | 385/75 |
| 5,603,631 A * | 2/1997 | Kawahara et al. | ......... | 439/352 |
| 5,633,970 A * | 5/1997 | Olson et al. | ................. | 385/78 |
| 5,682,451 A * | 10/1997 | Lee et al. | ..................... | 385/78 |
| 5,796,898 A * | 8/1998 | Lee | ............................ | 385/78 |
| 6,113,284 A * | 9/2000 | Wu et al. | .................... | 385/92 |
| 2004/0146252 A1* | 7/2004 | Healy et al. | ................ | 385/88 |

* cited by examiner

*Primary Examiner*—Frank G. Font
*Assistant Examiner*—Ryan Lepisto
(74) *Attorney, Agent, or Firm*—Workman Nydegger (57) ABSTRACT

A receptacle assembly that receives an optical connector. The receptacle assembly includes a first piece having a central bore with a stepped diameter. The receptacle assembly also includes an annular second piece designed to receive the optical connector and that has an outside surface designed to establish an interference fit with the inside surface of the first piece central bore. Further, the assembly includes an annular third piece that has a constant inner diameter and a stepped outer diameter. The outside surface of the third piece is designed to establish an interference fit with the inside surface of the annular second piece.

24 Claims, 5 Drawing Sheets

THREE PIECE RECEPTACLE ASSEMBLY FOR OPTICAL TRANSCEIVER SUB-ASSEMBLIES

CROSS-REFERENCE TO RELATED APPLICATIONS

This application claims priority to and the benefit of U.S. Provisional Patent Application Ser. No. 60/661,783, filed on Mar. 14, 2005, which is incorporated herein by reference in its entirety.

BACKGROUND OF THE INVENTION

1. The Field of the Invention

The present invention generally relates to the field of fiber optic couplers and, more specifically, to a three-piece receptacle assembly for joining to a ferrule containing an optical component or sub-assembly.

2. The Relevant Technology

Fiber optic technologies are increasingly used for transmitting voice and data signals. As a transmission medium, fiber optics provide a number of advantages over traditional electrical communication techniques. For example, light signals allow for extremely high transmission rates and very high bandwidth capabilities. Light signals also can be transmitted over greater distances without the signal loss typically associated with electrical signals on copper wire. These light signals are transmitted over optical waveguides, such as the optical fibers found in fiber optic cable.

Ferrule-type plug/receptacle optical connectors are typically used to position two optical waveguides, such as optical fibers, so that light can propagate between the two waveguides. Additionally, ferrule-type plug/receptacle optical connectors can be used to optically couple a waveguide to an optical component or subassembly. In this latter implementation, a ferrule-type plug at the end of an optical fiber is configured for insertion into a sleeve of a correspondingly configured receptacle of the component or subassembly. When coupled together, the sleeve fixes the position of the optical fiber end within the receptacle so as to optically couple the fiber with the component of subassembly such as, a transmitter optical sub-assembly (TOSA), a receiver optical sub-assembly (ROSA), for example. The receptacle sleeve is typically inserted into a base that is fixed to a housing of the TOSA/ROSA. This sleeve/base combination is typically referred to as a receptacle assembly. The ferrule of the plug and sleeve of the receptacle are manufactured to specific tolerances to ensure a proper friction fit between them, which allows the ferrule to be repeatedly removed and reconnected to the sleeve, while assuring proper alignment of the optical path.

The inner sleeve diameter of a receptacle assembly for Single Mode applications needs to be tightly controlled to yield sufficient "wiggle" performance of the TOSA and/or ROSA. During a wiggle test, a fiber cable is inserted into the TOSA and/or ROSA and a side load is applied to the fiber cable, which can result in movement of the ferrule at the tip of the optical connector plug within the receptacle assembly sleeve. This movement typically occurs partially as a result of a small gap between the receptacle assembly sleeve and the ferrule of the connector plug. This movement results in an undesirable change of coupled power into the fiber cable, which can substantially degrade transfer of optical signals between the connected elements and therefore needs to be controlled.

In some applications, one attempt at improving wiggle performance of the TOSA and/or ROSA has been to require tight manufacturing tolerances for the receptacle assembly in terms of sleeve diameter and roundness. Such tight manufacturing tolerances help to minimize the movement of the ferrule and can be achieved by manufacturing processes known in the art.

To meet these tight manufacturing specifications in an economic manner, the receptacle assembly sleeve generally must be machined to its final tight manufacturing tolerances before being assembled with the receptacle assembly base. The assembly process, however, usually introduces deformation of the receptacle assembly sleeve. Positive deformation, which occurs when the diameter of the sleeve grows, often results in poor wiggle performance, thus negating the advantages of having the tight manufacturing tolerances for the receptacle assembly sleeves. Negative deformation, which occurs when the diameter of the sleeve shrinks, results in a "hard plug", as a ferrule connector sticks or cannot be fully inserted anymore. In both cases if there is too much of deformation, parts need to be sorted out resulting in yield hit and higher costs.

Unfortunately, as a partial result of the tight manufacturing processes involved as described above, assembly of the sleeve with the receptacle assembly base can be made more difficult. Among these difficulties is the possibility of deformation of the receptacle assembly sleeve upon assembly with the base. This in turn leads to poor wiggle performance or a hard plug, which negates the intended benefit of the tight manufacturing tolerances used for these components.

BRIEF SUMMARY

Embodiments disclosed herein relate to a receptacle assembly that receives an optical connector. The receptacle assembly includes a first piece having a central bore with a stepped diameter. The receptacle assembly also includes an annular second piece designed to receive the optical connector and that has an outside surface designed to establish an interference fit with the inside surface of the first piece central bore. Further, the assembly includes an annular third piece that has an inner diameter and a stepped outer diameter. The outside surface of the third piece is designed to establish an interference fit with the inside surface of the annular second piece. This composite receptacle assembly is configured to minimize and erase stress and/or strain forces that can cause distortion of the receptacle assembly, in particular the sleeve. Minimization of distortion of the receptacle assembly in this manner improves wiggle performance of the receptacle assembly and its attached optical device, thereby improving optical coupling with respect to a connectorized optical fiber that matingly attaches to the receptacle assembly and also minimizing negative distortion/hard plug, resulting in lower yield hit.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the embodiments disclosed herein. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments of the present invention disclosed herein relate to a receptacle assembly that receives an optical connector. The receptacle assembly includes a first piece having a central bore with a stepped diameter. The receptacle assembly also includes an annular second piece designed to receive the optical connector and that has an outside surface designed to establish an interference fit with the inside surface of the first piece central bore. Further, the assembly includes an annular third piece that has an inner diameter and a stepped outer diameter. The outside surface of the third piece is designed to establish an interference fit with the inside surface of the annular second piece. This composite receptacle assembly is configured to minimize/erase stress and/or strain forces that can cause distortion of the sleeve/receptacle assembly during manufacture. Minimization or erasure of distortion of the receptacle assembly in this manner improves wiggle performance and reduces hard plug of the receptacle assembly and its attached optical device, thereby improving optical coupling with respect to a connectorized optical fiber that matingly attaches to the receptacle assembly and causing yield improvement of the receptacle assembly. Note that in some embodiments having a stepped diameter for only the inner or the outer diameter might be applicable for some applications. In addition, having two straight diameters might work fine for other applications.

FIGS. 1A-1G illustrate different views of one exemplary embodiment of a three-piece receptacle assembly, designated generally as reference numeral 100. Those skilled in the art will realize that exemplary embodiments of the present invention can be constructed to work with almost any standard connector. Such connectors can include, by way of example and not limitation, LC, SC, ST, STII, FC, AFC, FDDI, ESCON, and SMA, or any other connector designed to receive a ferrule. Note that the exemplary embodiment of FIGS. 1A-1G is only one of numerous embodiments in which the principles of the present invention may be practiced and should not be used to limit the scope of the appended claims.

Figure 1A:
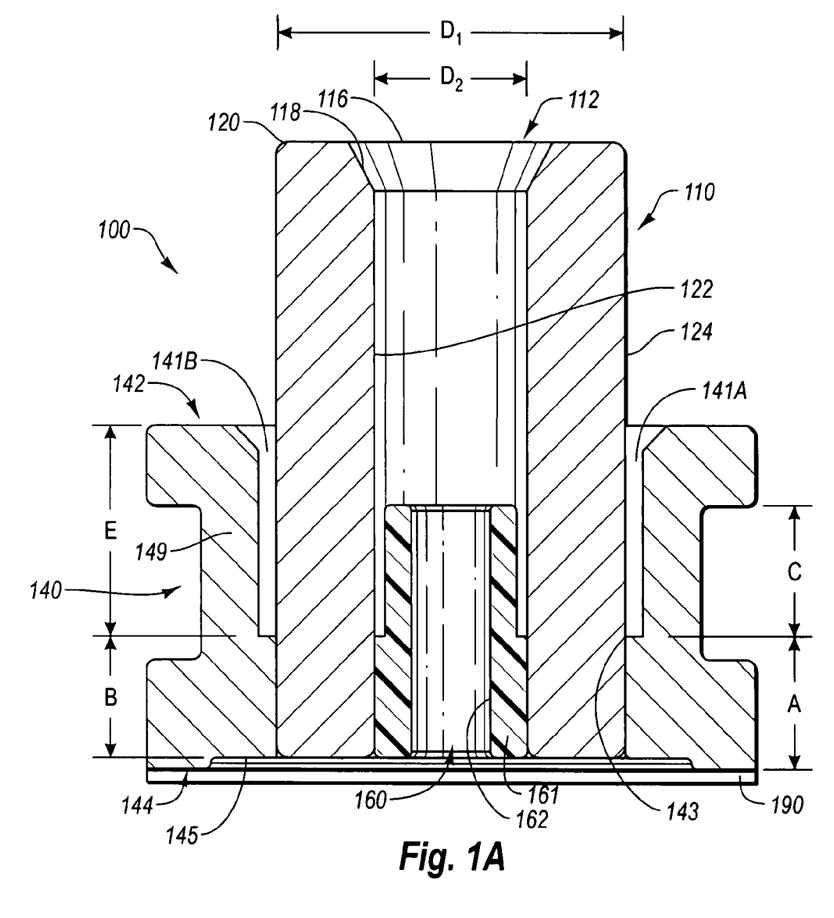
FIG. 1A illustrates a side view of one exemplary embodiment of a three piece receptacle assembly according to the principles of the present invention.

With reference to FIG. 1A, in this exemplary embodiment, receptacle assembly 100 includes a sleeve 110, a base 140, and a fiber stop plug 160 (hereinafter also referred to as "plug 160" for simplicity). This three piece construction makes machining and manufacturing the parts easier and more cost efficient. However, exemplary embodiments of the present invention can also be used with receptacle assemblies that have more than three parts. Such receptacle assemblies are also contemplated to fall within the scope of the exemplary embodiments. The invention is therefore not limited to the three piece construction shown in FIGS. 1A-1G.

Figure 1B:
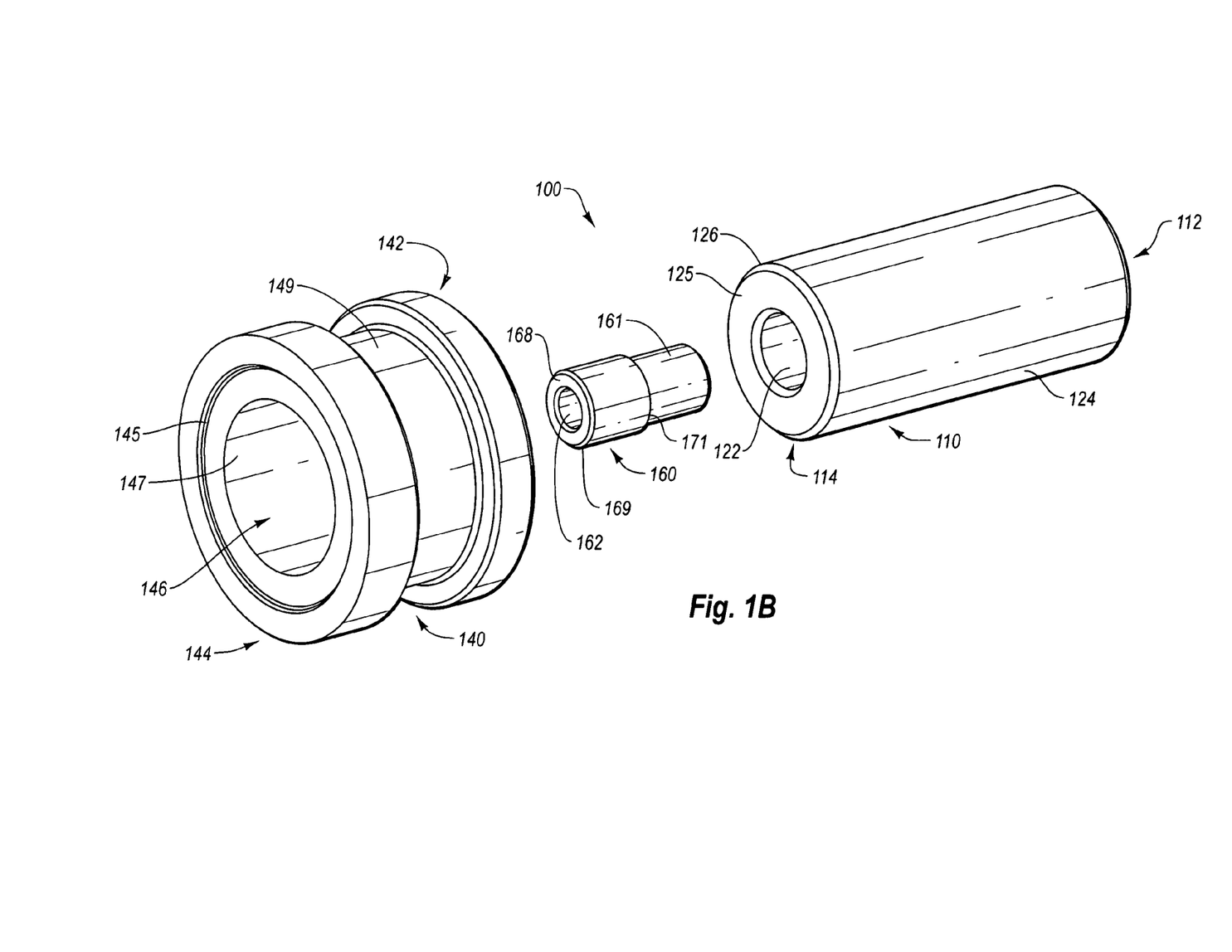
FIG. 1B illustrates a perspective view of the three piece receptacle assembly with the pieces separated.

Turning to FIGS. 1A and 1B, in this exemplary embodiment, sleeve 110 is an annular member sized and configured to i) be interference fit into base 140 and ii) receive a ferrule (not shown) containing an optical fiber (not shown). Sleeve 110 includes a first end 112 and a second end 114. First end 112 can have a top surface 116, an inside beveled edge 118, and an outside beveled edge 120. Beveled edge 118 makes it easier to insert a ferrule (not shown) into sleeve 110, while beveled edge 120 can aid with placement of sleeve 110 relative to an optical component or other optical connector. Second end 114 can have a bottom surface 125 and an outside beveled edge 126 as well as an inner beveled edge (not shown). Although reference is made to the use of various beveled edges, one will understand that the edges of sleeve 110 can have other configurations to aid with inserting a ferrule (not shown) into sleeve 110. For instance, at least a portion of each edge 118 and 120 can have a tapered or curved profile. In some embodiments, there may be no beveled edges implemented as part of sleeve 110.

In this exemplary embodiment, as illustrated in FIG. 1A, sleeve 110 has an outside diameter D1, and an inside diameter D2. Outside diameter D1 is chosen to allow sleeve 110 to fit into base 140, such that an outside surface 124 can interference fit with a portion of base 140. Additionally, inside diameter D2 is chosen to allow an inside surface 122 to fit around plug 160, such that inside surface 122 can interference fit about the outside surface 161 of plug 160, as will be discussed in more detail hereinafter. Note that in some embodiments outside diameter D1 and inside diameter D2 can be uniform for the entire length of sleeve 110, although this is not required. The principles of the present invention contemplate embodiments where outside diameter D1 and inside diameter D2 are not constant along the entire length of sleeve 110. Note also that "interference fit" as used herein is understood as defining a "press fit" or frictional engagement between respective components.

In some embodiments, sleeve 110 may be made from metal. Examples of metals that may be used include, but are not limited to carbon steel, and 416 steel. In other embodiments, sleeve 110 may be made from ceramics. Other suitable materials known in the art may also be used to make sleeve 110.

As mentioned above, sleeve 110 cooperates with base 140, which has an outside surface 149. With reference to FIGS. 1A-1D, the base 140 includes a central bore 146 that extends from a first end 142 to a second end 144. First end 142 can have a top surface 155 and an inside beveled edge 156. The central bore 146 includes an interior surface 147. As mentioned previously, interior surface 147, or at least a portion thereof defines an interference fit with outer surface 124 of sleeve 110.

Figure 1C:
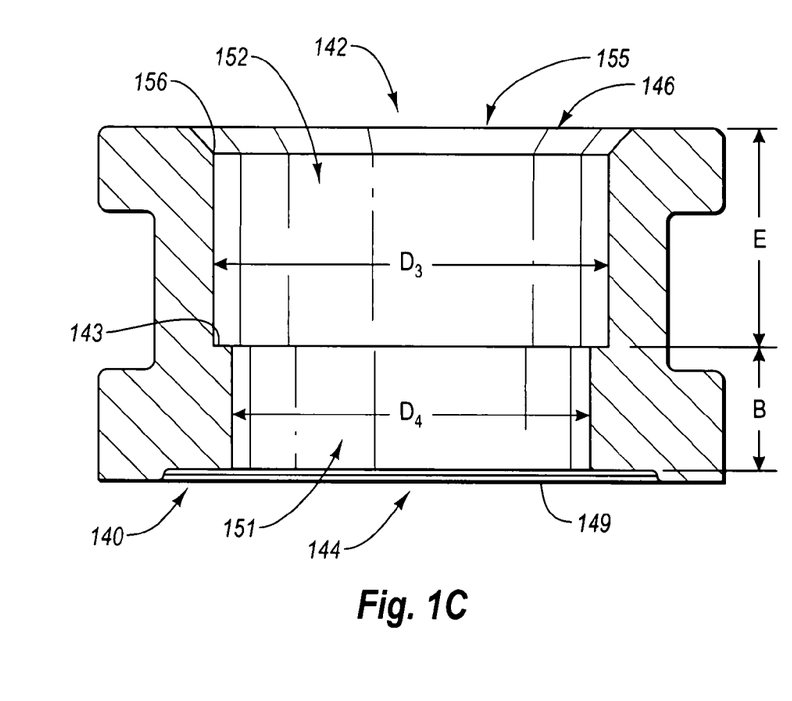
FIG. 1C illustrates a side view of a base piece of the three piece receptacle assembly of FIG. 1A.
Figure 1D:
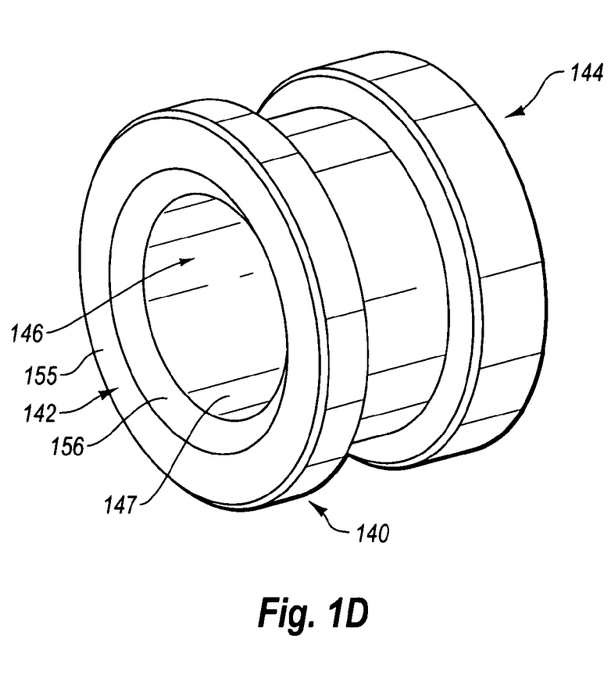
FIG. 1D illustrates a perspective view of the base piece of FIG. 1C.

Referring specifically to FIG. 1C, a side view of base 140 is depicted showing central bore 146 and first and second ends 142 and 144. It is further illustrated that central bore 146 includes a stepped diameter. For example, a first portion 151 of the central bore 146 a distance B from second end 144 has a diameter D4. In some embodiments, the distance B is approximately 1 millimeter, although this is not required as the embodiments disclosed herein contemplate other reasonable lengths for distance B. Diameter D4 in some embodiments may be smaller than or equal to outer diameter D1 of sleeve 110, although this also is not required. Such dimensions for diameter D4 advantageously allow for a secure interference fit between base 140 and sleeve 110 as will be described in more detail to follow.

Returning to FIG. 1C, a second portion 152 of central bore 146 a distance E between first portion 151 and first end 142 has a diameter D3 that is larger than diameter D4 of first portion 151. As illustrated, the change or step between the diameters of portions 151 and 152 creates a step 143 inside of central bore 146. Note that step 143 may also be a chamfer type that serves as a lead in for the sleeve. In some embodiments, the distance E is approximately 1.8 millimeters, although this is not required as the embodiments disclosed herein contemplate other reasonable lengths for distance E. Implementing diameter D3 to be larger than diameter D4, which typically means diameter D3 will also be larger than outer diameter D1 of sleeve 110, advantageously allows for minimized distortion of sleeve 110 during a receptacle assembly 100 manufacturing process as will be described in more detail to follow.

In such embodiments where diameter D3 is larger than diameter D1, gaps 141A and 141B (FIG. 1A) may be created between outer surface 124 of sleeve 110 and the portion of inner surface 147 of base 140 equal to distance E. In such embodiments, glue may be used to fill gaps 141A and 141B in order to strengthen receptacle assembly 100 as circumstances warrant. Such circumstances may include cases where a weak interference fit is implemented between sleeve 110 and base 140.

With specific reference to FIG. 1B, base 140 also includes an annular groove 145 on the outside surface 149. Annular groove 145 is located proximate second end 144 and is used to help weld base 140 to a housing 190 (FIG. 1A) of a TOSA or ROSA that contains an optical device. In some embodiments, base 140 is welded to housing 190 using a welding process that implements a pulsed laser.

Base 140 can be, by way of example and not limitation, 304 stainless steel, SS430, SF20T or other stainless or non-stainless steels, or other metals known in the art. As previously mentioned, base 140 is welded to housing 190, which can also be 304 stainless, other stainless or non-stainless steels, or other metals known in the art.

As mentioned previously, plug 160 is also implemented as part of receptacle assembly 100. In some embodiments, plug 160 may be made from metal. Examples of metals that may be used include, but are not limited to carbon steel, 416 steel, and SS303 steel, which is typically cheaper than carbon steel or 416 steel.

Turning to FIGS. 1A-1B and 1E-1F, in this exemplary embodiment, plug 160 is an annular member sized and configured to i) be interference fit completely inside sleeve 110 and ii) interface with a ferrule (not shown) containing an optical fiber (not shown). In addition, plug 160 includes a central bore 175 that connects to an opening (not shown) in housing 190 to allow optical light to travel between the optical device housed in housing 190 and the ferrule interfacing with plug 160. Plug 160 has a height that is in between first and second ends of base 140, typically closer to first end 142, although this is not required.

Figure 1E:
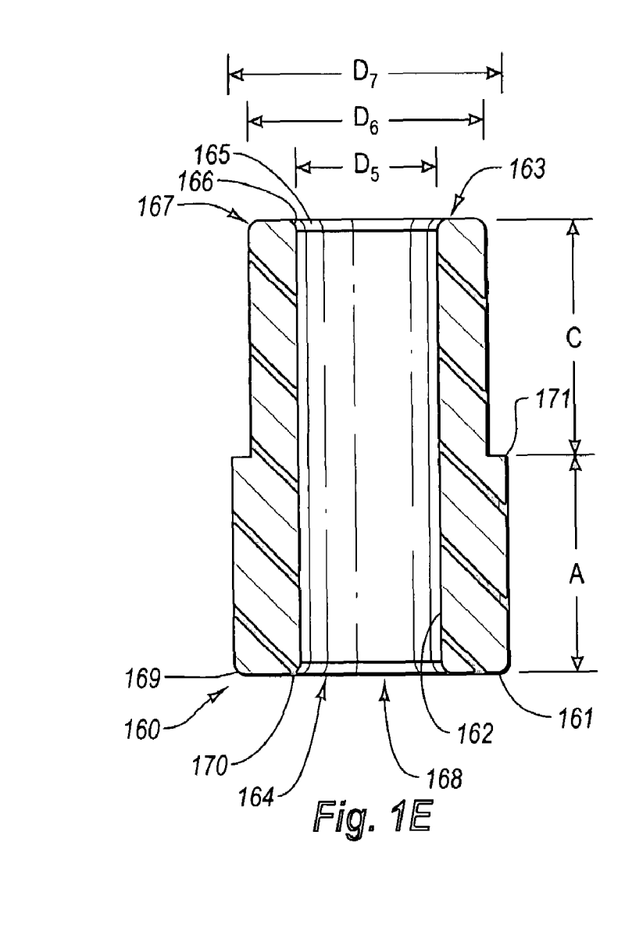
FIG. 1E illustrates a side view of a fiber stop plug piece of the three piece receptacle assembly of FIG. 1A.
Figure 1F:
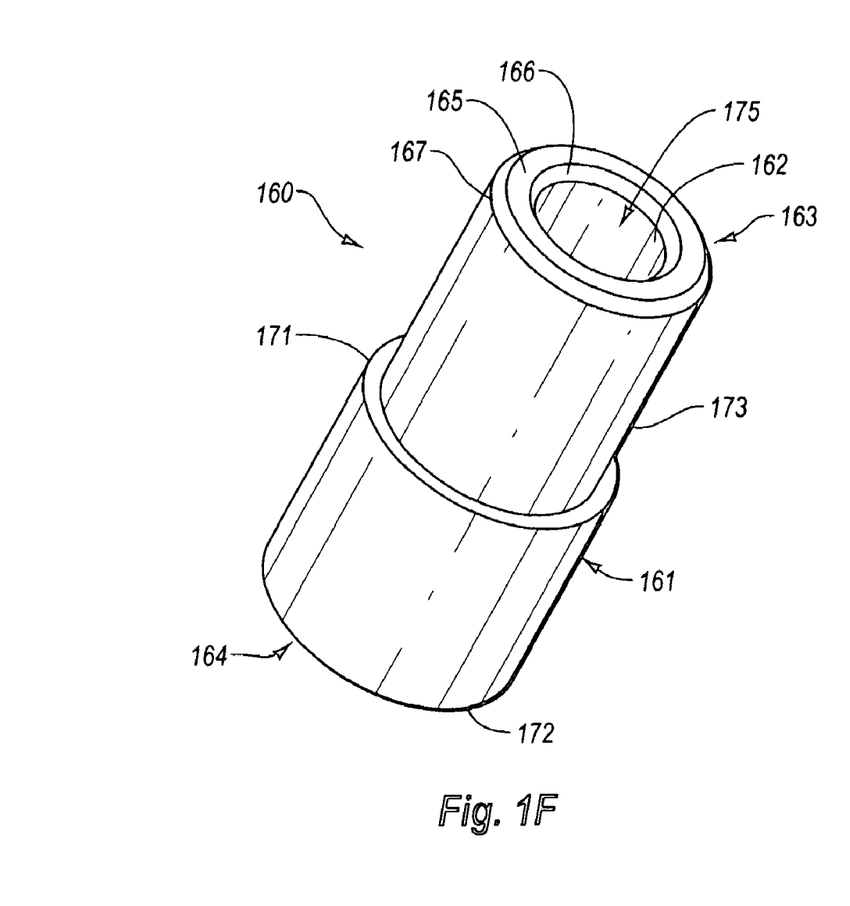
FIG. 1F illustrates a perspective view of the fiber stop plug piece of FIG. 1E.

Plug 160 includes a first end 163 and a second end 164. First end 163 can have a top surface 165, an inside beveled edge 166, and an outside beveled edge 167. Second end 164 can have a bottom surface 168 and an outside beveled edge 169 as well as an inner beveled edge 170. Although reference is made to the use of various beveled edges, plug 160 can have other configurations as well.

In this exemplary embodiment, as illustrated in FIG. 1E, plug 160 has an inside diameter D5 and an inside surface 162. Diameter D5 is chosen to provide an appropriate interface for a ferrule inserted into receptacle assembly 100. Note that in some embodiments inside diameter D5 can be uniform for the entire length of plug 160, although this is not required. The principles of the present invention contemplate embodiments where inside diameter D2 is not constant the entire length of plug 110

It is also illustrated in FIG. 1E that outer surface 161 has a stepped diameter or chamfer to serve as a lead in for press fit to the sleeve. For example, a first portion 172 (FIG. 1F) of the outer surface 161 a distance A from second end 164 has a diameter D7. In some embodiments, the distance A is approximately 1 millimeter, although this is not required as the embodiments disclosed herein contemplate other reasonable lengths for distance A. Diameter D7 in some embodiments may be larger than or equal to inner diameter D2 of sleeve 110, although this also is not required. Such dimensions for diameter D7 advantageously allow for a strong interference fit between plug 160 and sleeve 110 as will be described in more detail to follow. Note that although in the present embodiment length A of plug 160 and length B of base 140 are the same length, this is not required. The embodiments disclosed herein also contemplate having length A and length B implemented as different lengths.

Returning to FIG. 1E, a second portion 173 (FIG. 1F) of outer surface 161 a distance C between first portion 172 and first end 163 has a diameter D6 that is smaller than diameter D7 of first portion 172. As illustrated, the change or step between the diameters of portions 172 and 173 creates a step 171 on the outer surface 161. In some embodiments, the distance C is also approximately 1 millimeter, although this is not required as the embodiments disclosed herein contemplate other reasonable lengths for distance C. Implementing diameter D6 to be smaller than diameter D7, which typically means diameter D6 will also be smaller than inner diameter D2 of sleeve 110, advantageously allows for minimized distortion of sleeve 110 during a receptacle assembly 100 manufacturing process as will be described in more detail to follow.

Figure 1G:
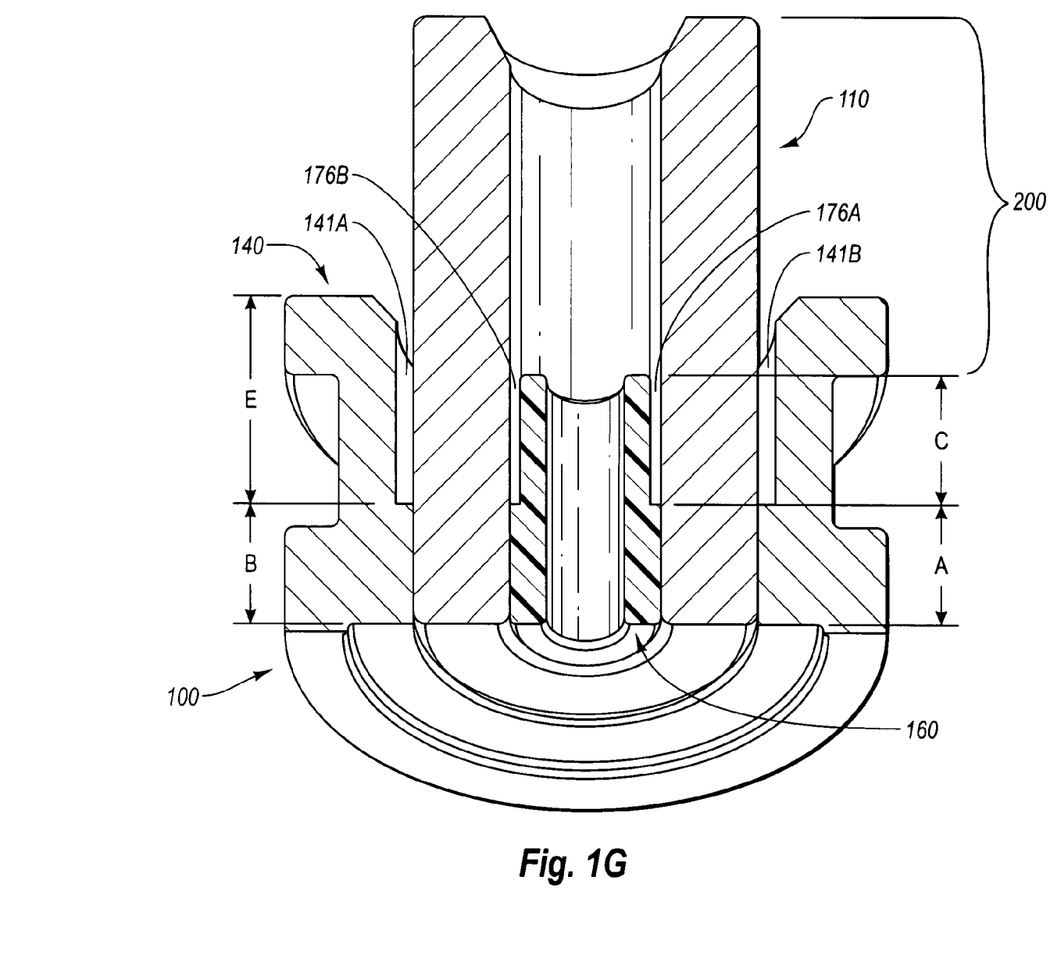
FIG. 1G illustrates a side view of the three piece receptacle assembly as assembled according to the principles of the present invention.

Referring now to FIG. 1G, a side view of receptacle assembly 100 with all three pieces assembled together is shown. Specifically, FIG. 1G illustrates sleeve 110 interference fit with base 140 and plug 160 interference fit with sleeve 110. As with previous designs, it is often necessary to manufacture sleeve 110, base 140, and plug 160 separately to ensure an economic way to comply with the tight manufacturing specifications previously discussed. Note that the embodiments disclosed herein allow for pretty loose tolerances on the metal parts, such that any typical machine shop could hold the tolerances due to the special design, resulting in lower costs. Sleeve 110, base 140, and plug 160 are then assembled into receptacle assembly 100 using such processes as press-fitting. As mentioned previously, the specific design of base 140 and plug 160 advantageously help to minimize and/or erase the distortion to sleeve 110 during the receptacle assembly 100 assembly process, as will now be explained in more detail.

During manufacture, plug 160 is pressed into sleeve 110 as previously described in order to define an interference fit there between. As mentioned, plug 160 has a stepped outer diameter. The portion of the outer diameter corresponding to length A is designed to be larger than or equal to the inner diameter of sleeve 110. This ensures a proper interference fit between plug 160 and sleeve 110 in the area corresponding to length A. However, this also imposes distortional forces on the sleeve 110. To minimize any distortion, the portion of the outer diameter corresponding to length C has a smaller diameter than the inner diameter of sleeve 110. Accordingly, gaps 176A and 176B are created that reduce the distortional force on sleeve 110 in the area corresponding to length C, thus resulting in a minimal distorted sleeve shape in a sleeve sensitive area 200. Note that sleeve sensitive area 200 is the portion that the front face of an inserted ferrule interfaces with plug 160.

In like manner, the sleeve 110 and plug 160 combination is then pressed into base 140 to define an interference fit there between. The central bore 146 of base 140 advantageously includes a stepped diameter. The portion of the bore diameter corresponding to length B is designed to have a diameter that is equal to or smaller than the outer diameter of sleeve 110. This ensures a proper interference fit between the base 140 and the sleeve 110, although distortion or force also imposed in the area corresponding to length B as a result of the pressing. The portion of the bore diameter corresponding to length E, however, has a diameter larger than the outer diameter of sleeve 110. Accordingly, gaps 141A and 141B are created as previously explained that reduce the distortional force on sleeve 110 in the area corresponding to length E, thereby minimizing the amount of sleeve 110 distortion in sleeve sensitive area 200. As mentioned, minimizing the distortion of the sleeve in the sleeve sensitive area allows for improved wiggle performance and/or less hard plug of the optical device. In addition, using the two press fit process allows the outer press fit to at least partially counter balance deformation introduced through inner press fit.

In some embodiments, assembly 100 need not include a stepped diameter for central bore 146 and a stepped diameter of the outer surface of plug 160. In such embodiments, allowing the outer press fit to at least partially counter balance and partially erase deformation introduced by the inner press fit may be sufficient. Referring to the figures, assembly 100 would include a base 140 with a central bore 146 without step 143. Assembly 100 may include the other aspects of base 140 previously described. In addition, assembly 100 may include a sleeve 110 with the aspects previously described. Further, sleeve 100 would also include a plug 160 without step 160, but that may include the other aspects of plug 160 previously described.

In still other embodiments, it may be desirable to have an assembly 100 with a combination of pieces having a stepped diameter and pieces having a non-stepped diameter. For example, in one embodiment assembly 100 may include a central bore 146 with a stepped diameter as previously described. However, in this embodiment, plug 160 may have a constant outer diameter. In other embodiments, central bore 146 may have a constant diameter while plug 160 has a stepped outer diameter. The embodiments disclosed herein thus contemplate different combinations of stepped and non-stepped diameters as circumstances warrant.

Accordingly, the embodiments disclosed herein relate to a three piece receptacle assembly designed to minimize the distortion on a sleeve piece during manufacture of the receptacle assembly. Specifically, a base piece and a fiber stop plug piece are designed with stepped diameters. The stepped diameters allow for a portion of the base and the fiber stop plug to have a sufficient interference fit with the sleeve while relaxing the interference fit in other portions. This relaxing in turn leads to a minimized or erased sleeve distortion in the portion of the sleeve that receives a ferrule connector plug, thus leading to sufficient wiggle performance of the optical device when connected using the receptacle assembly and leading to reduced hard plug. Accordingly, the principles of the present invention represent a significant advancement in the art.

The present invention may be embodied in other specific forms without departing from its spirit or essential characteristics. The described embodiments are to be considered in all respects only as illustrative and not restrictive. All changes which come within the meaning and range of equivalency of the claims are to be embraced within their scope.

The invention claimed is:

1. A receptacle assembly configured to receive an optical connector, the receptacle assembly comprising:
   a first piece including a central bore defining a stepped diameter;
   an annular second piece designed to receive the optical connector and having an outside surface that forms an interference fit with an inside surface of the central bore, wherein the outside surface of the annular second piece and the stepped diameter of the first piece define a gap and wherein the annular second piece includes a constant inner diameter and a constant outer diameter; and
   an annular third piece having an inner diameter and an outside surface, the outside surface defined by a stepped outer diameter designed to form an interference fit with an inside surface of the annular second piece, wherein the annular third piece is interference fit completely within the annular second piece.

2. The receptacle assembly of claim 1, wherein the stepped outer diameter of the annular third piece comprises:
   a first portion with a diameter larger than or equal to an inner diameter of the annular second piece, such that the annular second and annular third pieces form an interference fit with each other; and
   a second portion with a diameter smaller than the diameter of the first portion.

3. The receptacle assembly of claim 2, wherein the first portion is approximately 1 millimeter in length and the second portion is approximately 1 millimeter in length.

4. The receptacle assembly of claim 1, wherein the stepped diameter of the central bore of the first piece comprises:
   a first portion with a diameter smaller than or equal to an outer diameter of the annular second piece, such that the annular second and first pieces form an interference fit with each other; and
   a second portion with a diameter larger than the diameter of the first portion.

5. The receptacle assembly of claim 4, wherein the first portion is approximately 1 millimeter in length and the second portion is approximately 1.8 millimeters in length.

6. The receptacle assembly of claim 1, wherein the first, second and third pieces comprise metal.

7. The receptacle assembly of claim 1, wherein said first and third pieces comprise metal and said second piece comprises ceramic.

8. The receptacle assembly of claim 1, wherein the stepped diameter of the first and third pieces minimizes distortion to the second piece during manufacturing, and deformation introduced by a first press fit gets partly erased by deformation introduced through a second press fit.

9. The receptacle assembly of claim 1, wherein said optical connector is any one of a SC, LC, ST, STII, FC, AFC, FDDI, ESCON, and SMA connector.

10. The receptacle assembly of claim 1, wherein the stepped outer diameter of the annular third piece and the inside surface of the annular second piece define a second gap.

11. A system for connecting an optical connector containing an optical fiber to an optical device, the system comprising:
- a housing for the optical device; and
- a receptacle assembly attached to the optical device, the receptacle assembly including:
  - a first piece including a central bore defining a stepped diameter;
  - an annular second piece designed to receive the optical connector and having an outside surface that forms an interference fit with an inside surface of the central bore, wherein the outside surface of the annular second piece and the stepped diameter of the first piece define a gap and wherein the annular second piece includes a constant inner diameter and a constant outer diameter; and
  - an annular third piece having an inner diameter and an outside surface, the outside surface defined by a stepped outer diameter designed to form an interference fit with an inside surface of the annular second piece, wherein the annular third piece is interference fit completely within the annular second piece.

12. The system of claim 11, wherein the stepped outer diameter of the annular third piece comprises:
- a first portion with a diameter larger than or equal to an inner diameter of the annular second piece, such that the annular second and annular third pieces form an interference fit with each other; and
- a second portion with a diameter smaller than the diameter of the first portion.

13. The system of claim 11, wherein the stepped diameter of the central bore of the first piece comprises:
- a first portion with a diameter smaller than or equal to an outer diameter of the annular second piece, such that the annular second and first pieces form an interference fit with each other; and
- a second portion with a diameter larger than the diameter of the first portion.

14. The system of claim 11, wherein said housing, said first piece, said second piece, and said third piece comprise metal.

15. The system of claim 11, wherein said housing, said first piece, and said third piece comprise metal and said second piece comprises ceramic.

16. The system of claim 11, wherein the stepped diameter of the first and third pieces minimizes distortion to the second piece during manufacturing.

17. The system of claim 11, wherein the optical connector is any one of a SC, LC, ST, STII, FC, AFC, FDDI, ESCON, and SMA connector.

18. The system of claim 11, wherein the stepped outer diameter of the annular third piece and the inside surface of the annular second piece define a second gap.

19. A receptacle assembly configured to receive an optical connector, the receptacle assembly comprising:
- a first piece including a central bore;
- an annular second piece designed to receive the optical connector and having an outside surface that forms an interference fit with an inside surface of the bore, wherein the annular second piece includes a constant inner diameter and a constant outer diameter; and
- an annular third piece having an inner diameter and an outside surface, the outside surface defined by a stepped outer diameter designed to form an interference fit with an inside surface of the annular second piece, wherein the annular third piece is interference fit completely within the annular second piece and wherein the stepped outer diameter of the annular third piece and the inside surface of the annular second piece define a gap.

20. The receptacle assembly of claim 19, wherein the central bore of the first piece defines a stepped diameter.

21. The receptacle assembly of claim 20, wherein the stepped diameter of the central bore of the first piece comprises:
- a first portion with a diameter smaller than or equal to an outer diameter of the annular second piece, such that the annular second and first pieces form an interference fit with each other; and
- a second portion with a diameter larger than the diameter of the first portion.

22. The receptacle assembly of claim 19, wherein the first, second and third pieces comprise metal.

23. The receptacle assembly of claim 19, wherein said first and third pieces comprise metal and said second piece comprises ceramic.

24. The receptacle assembly of claim 19, wherein said optical connector is any one of a SC, LC, ST, STII, FC, AFC, FDDI, ESCON, and SMA connector.

* * * * *

UNITED STATES PATENT AND TRADEMARK OFFICE
CERTIFICATE OF CORRECTION

PATENT NO. : 7,357,580 B2
APPLICATION NO. : 11/374748
DATED : April 15, 2008
INVENTOR(S) : Morgenstern et al.

It is certified that error appears in the above-identified patent and that said Letters Patent is hereby corrected as shown below:

Col. 7
Line 57 change "without step 160" to --without step 171--

Signed and Sealed this

Sixteenth Day of November, 2010

David J. Kappos
*Director of the United States Patent and Trademark Office*